US009172954B2

(12) United States Patent
Pearlstein

(10) Patent No.: US 9,172,954 B2
(45) Date of Patent: Oct. 27, 2015

(54) HYBRID MEMORY COMPRESSION SCHEME FOR DECODER BANDWIDTH REDUCTION

(71) Applicant: Broadcom Corporation, Irvine, CA (US)

(72) Inventor: Larry Pearlstein, Newtown, PA (US)

(73) Assignee: BROADCOM CORPORATION, Irvine, CA (US)

( * ) Notice: Subject to any disclaimer, the term of this patent is extended or adjusted under 35 U.S.C. 154(b) by 4 days.

(21) Appl. No.: 14/058,706

(22) Filed: Oct. 21, 2013

(65) Prior Publication Data

US 2014/0044189 A1    Feb. 13, 2014

Related U.S. Application Data

(63) Continuation of application No. 11/971,045, filed on Jan. 8, 2008, now Pat. No. 8,565,310.

(51) Int. Cl.
| H04N 19/00 | (2014.01) |
| H04N 19/139 | (2014.01) |
| H04N 19/105 | (2014.01) |
| H04N 19/176 | (2014.01) |
| H04N 19/51 | (2014.01) |
| H04N 19/61 | (2014.01) |
| H04N 19/127 | (2014.01) |
| H04N 19/426 | (2014.01) |

(52) U.S. Cl.
CPC ....... *H04N 19/00151* (2013.01); *H04N 19/105* (2014.11); *H04N 19/127* (2014.11); *H04N 19/139* (2014.11); *H04N 19/176* (2014.11); *H04N 19/428* (2014.11); *H04N 19/51* (2014.11); *H04N 19/61* (2014.11)

(58) Field of Classification Search
CPC ...... H04N 7/50; H04N 7/26244; H04N 5/145
USPC ................................ 370/240.02; 375/240.16
See application file for complete search history.

(56) References Cited

U.S. PATENT DOCUMENTS

| 5,459,517 | A | 10/1995 | Kunitake et al. |
| 5,703,647 | A * | 12/1997 | Kim ........................... 348/403.1 |
| 6,370,192 | B1 | 4/2002 | Pearlstein et al. |
| 6,549,575 | B1 | 4/2003 | Butter et al. |
| 2002/0196853 | A1 * | 12/2002 | Liang et al. .............. 375/240.16 |
| 2004/0213345 | A1 | 10/2004 | Holcomb et al. |

OTHER PUBLICATIONS

International Telecommunication Union, "H.264 Advanced Video Coding for Generic Audiovisual Services", Series H: Audiovisual and Multimedia Systems Infrastructure of Audiovisual Services—Coding of Moving Video, Nov. 2007.

* cited by examiner

*Primary Examiner* — Hassan Kizou
*Assistant Examiner* — Ashil Farahmand
(74) *Attorney, Agent, or Firm* — Foley & Lardner LLP

(57) ABSTRACT

A method for reducing memory bandwidth in a video decoder begins by performing a data reduction operation on a decoded first coded image to produce a second set of image data. The second set of image data stored and is selectively used for subsequent image decoding, thereby reducing the memory bandwidth. The data reduction operation can include image downsampling, wherein the pixel density is reduced by a factor of two in each of the vertical and horizontal directions.

20 Claims, 4 Drawing Sheets

100 ized as described above (step 112).
HYBRID MEMORY COMPRESSION SCHEME FOR DECODER BANDWIDTH REDUCTION

CROSS-REFERENCE TO RELATED APPLICATION

This application is a continuation of copending U.S. utility application entitled, "Hybrid Memory Compression Scheme for Decoder Bandwidth Reduction," having Ser. No. 11/971,045, filed Jan. 8, 2008, which is entirely incorporated herein by reference.

FIELD OF INVENTION

The present invention relates generally to video decoders, and more particularly, to a system and method for reducing memory bandwidth in a video decoder and/or decreasing the cache size necessary to achieve a given level of system performance.

BACKGROUND

Digital video decoders for the H.264 standard require high memory bandwidth to off-chip memory and/or large amounts of on-chip cache memory. The reason for this is because the H.264 standard supports the use of multiple reference images for motion prediction, relatively small block sizes for motion compensation (e.g., blocks of 4×4 pixels), and a large motion vector range. Motion compensated prediction permits the exploitation of the frequent similarities from one frame to another, such that only the changes between successive frames need to be transmitted, thereby permitting higher data compression efficiency. For example, if Frame 1 and Frame 3 are encoded before Frame 2, any motion that occurs between Frames 1 and 2 and Frames 2 and 3 can be more accurately predicted during encoding of Frame 2. To properly decode Frame 2, both Frame 1 and Frame 3 have to be stored at the decoder as reference images prior to Frame 2 arriving at the decoder.

Because multiple reference images must be stored at any given point in time, the decoder needs to have sufficient and quickly accessible storage space for the multiple images. Generally this means that there needs to be a large enough memory buffer (i.e., a cache) in the decoder or there needs to be a fast (i.e., a high bandwidth) connection between the decoder and the off-chip memory.

An existing decoding method 100 is shown in FIG. 1. A decoder receives multiple reference images (step 102), decodes each of the reference images (step 104), and stores all of the decoded reference images (step 106). A motion vector is information sent to the decoder relating to where in the reference image the decoder needs to look to obtain the necessary data to create the new image. The motion vector includes a horizontal component and a vertical component and is presented as a value relative to the reference image. For example, a stationary background between the reference image and the new image would be represented by a motion vector of zero. A macroblock is typically a 16×16 block of pixels; unique motion vectors may be applied to smaller blocks depending on the level of detail which moves at different velocities.

A motion, vector for the first macroblock in the new image is decoded (step 110). The decoder selects a reference image (from the multiple stored reference images) to use for motion prediction (step 112). The decoder uses the motion vector and the corresponding block of pixel data (along with padding pixels used for filtering, as may be required) in the selected reference image to derive a predicted block (step 114). A check is made whether there are more macroblocks for the new image that need to be decoded (step 116). If there are no more macroblocks for the new image, then the method terminates (step 118) and the new image has been completely decoded. If there are more macroblocks far the new image, then the motion vector for the next macroblock is decoded (step 120) and the reference image to be used with the next macroblock is selected as described above (step 112).

Existing scaleable decoding systems also maintain low resolution versions of the reference image that are upsampled.

There is a need in the art to preserve the ability to maintain high compression efficiency, but reduce memory bandwidth.

SUMMARY

The use of data reduction techniques (including downsampling) by a video encoder for storage of reference pictures produced by its model decoder, to be used for creating predictions for coding future pictures.

A method for reducing memory bandwidth in a video decoder begins by performing a data reduction operation on a decoded first coded image to produce a second set of image data. The second set of image data stored and is selectively used for subsequent image decoding, thereby reducing the memory bandwidth. The data reduction operation can include image downsampling, for example, wherein the pixel density is reduced by a factor of two in each of the vertical and horizontal directions.

BRIEF DESCRIPTION OF THE DRAWINGS

A more detailed understanding of the invention may be had from the following description, given by way of example, and to be understood in conjunction with the accompanying drawings, wherein.

DETAILED DESCRIPTION

The present invention relates to maintaining two or more versions of some or all reference images, or portions thereof, in storage in a video decoder. For any given region of image data to be predicted, the decision regarding which version of a reference image to be used is based on a measure of the size of the motion vector to be applied. In one embodiment, a first version of a reference image is a full resolution image produced by the decoder. A second version of the reference image is obtained by downsampling the decoded image by a factor of two in both the vertical and horizontal directions. More generally, the second version of a reference image may be obtained by applying some form of lossy data reduction. Examples of lossy data reduction include downsampling and quantized transform coding. For predictions with small motion vectors, the full resolution version of the reference image is used. For predictions whose motion vectors are larger than a predetermined, threshold, the downsampled version of the reference image is used. In this way, a relatively small cache of full resolution pictures could be maintained as a means to reduce the required external memory bandwidth. An example of an external memory is a Dynamic Random Access Memory (DRAM) component, which could be on the same chip as the video decoder, in a separate chip but in the same integrated package as the video decoder chip, or in a separate chip.

Method for Decoding Images Using Downsampling

Figure 1:
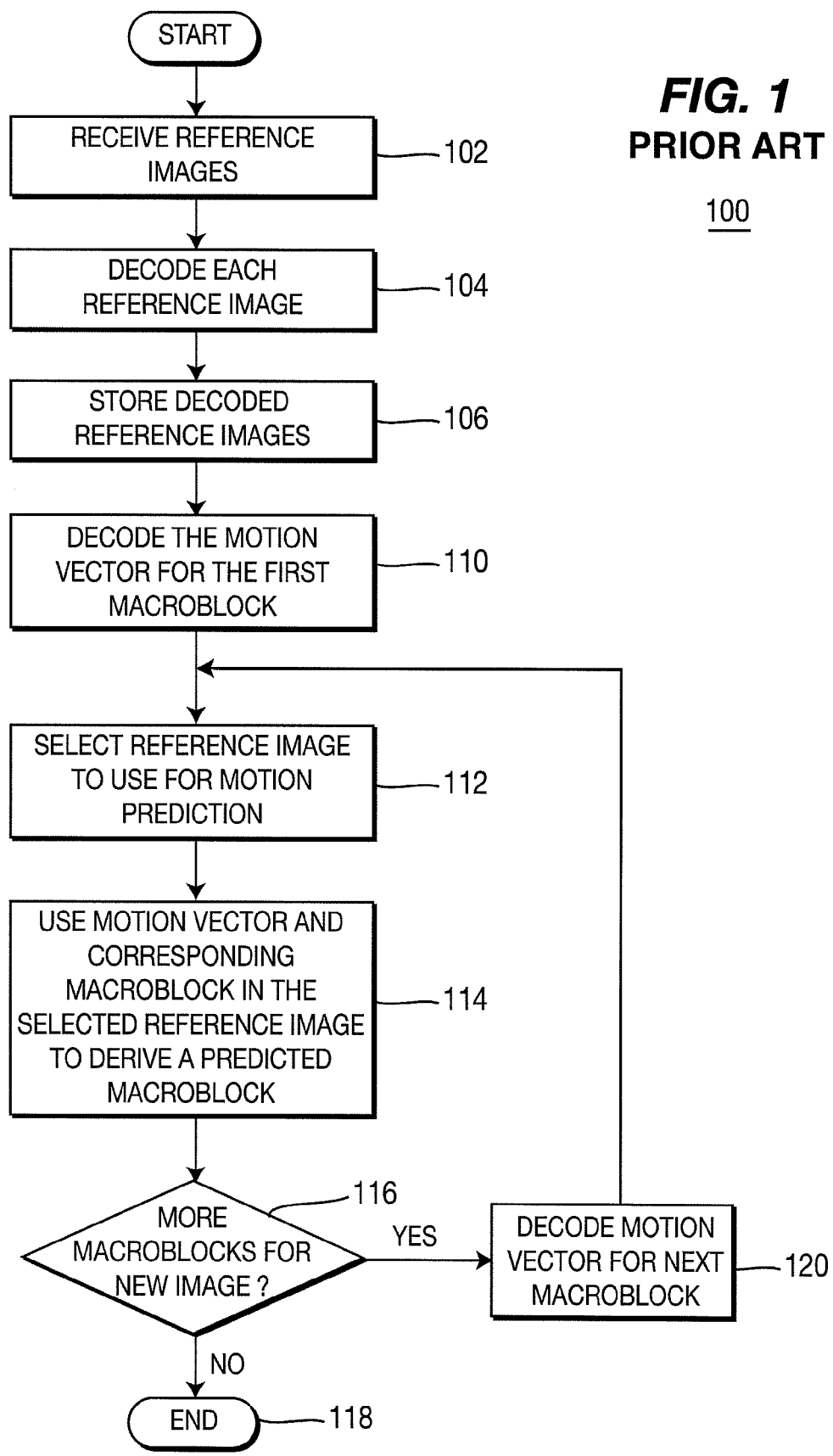
FIG. 1 is a flowchart of an existing method for decoding images.
Figure 2:
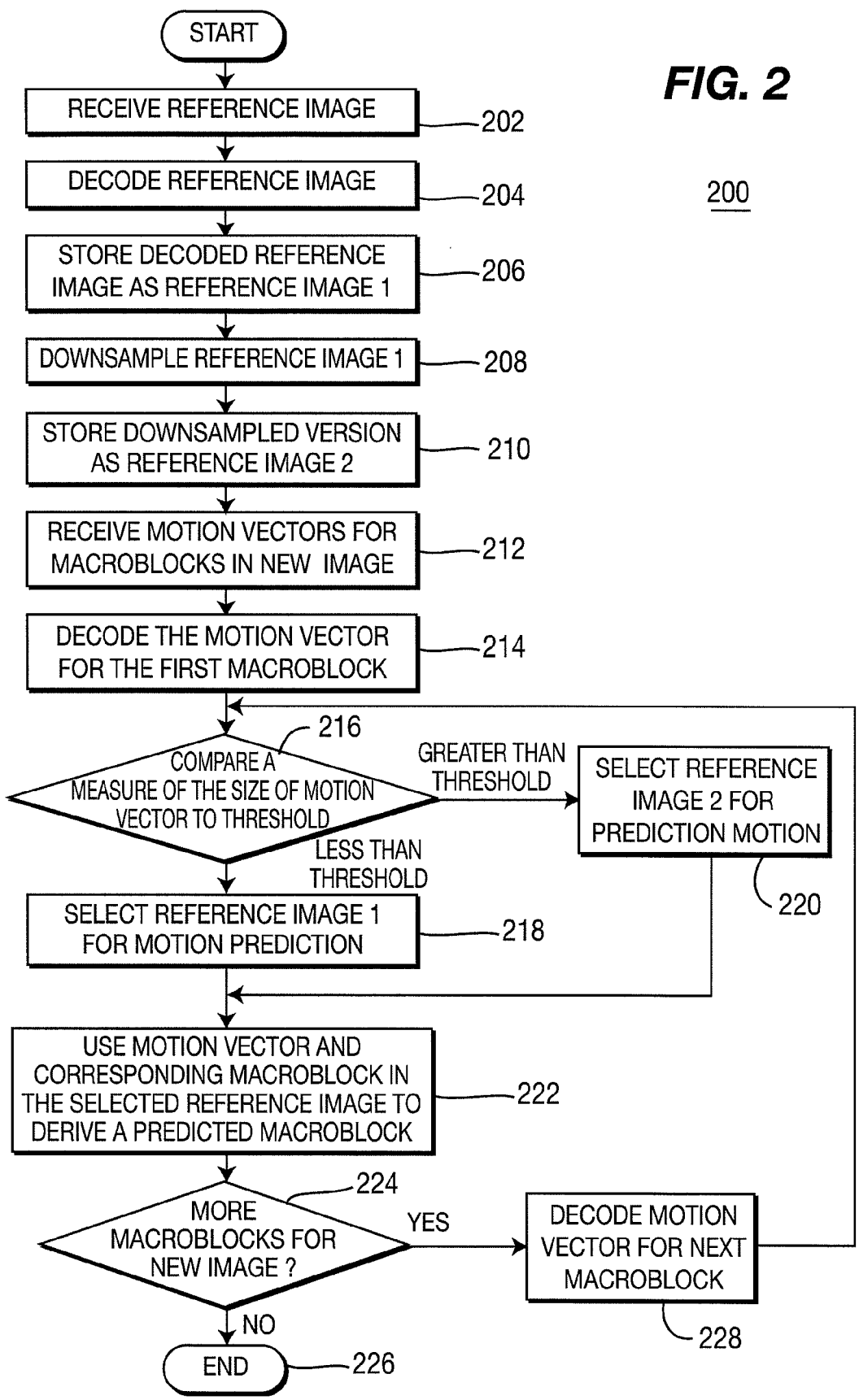
FIG. 2 is a flowchart of a method for decoding images including downsampling the reference image.

FIG. 2 is a flowchart of a method 200 for decoding images including downsampling the reference image. A decoder receives a full resolution reference image (step 202), decodes the reference image (step 204), and stores the decoded full resolution reference image as Reference Image 1 (step 206). It is noted that the identifier "Reference Image 1" is for discussion purposes only and that one skilled in the art can find other ways of identifying the full resolution reference image.

The decoder downsamples Reference Image 1 (step 208) and stores the downsampled version of the image as Reference Image 2 (step 210). Image downsampling is well known to one of skill in the art, and may be accomplished by, for example, low pass filtering followed by decimation.

In one embodiment, downsampling by a factor of two in both the vertical and horizontal directions is applied, which can effectively reduce the bandwidth to almost one quarter of what it would be without the downsampling. Downsampling the reference image at a different level depends on the nature of the reference image (i.e., it is content dependent). If the reference image has a high level of detail, then downsampling is not going to provide good reference images because the detail could be lost during downsampling. But if the reference image is noisy and/or has a lower level of detail, then downsampling can provide a pod reference image at a reduced memory bandwidth.

The decoder receives motion vectors for each of the macroblocks in a new image (step 212). The motion vector for the first macroblock in the new image is decoded (step 214). A measure of the size of the decoded motion vector is compared to a threshold (step 216). One example of a threshold is a magnitude of eight pixels and one example of a measure of motion vector size is the Euclidean Length ($l_1$ norm). If the measure of the size of the motion vector is sufficiently large (e.g., greater than eight pixels per frame), there is typically some visible amount of motion blur. In areas represented with large motion vectors, the motion blur may be sufficient such that downsampling would not introduce noticeable distortion.

If the measure of the size of the motion vector is less than the threshold, then Reference Image 1 (the full resolution version) is selected for motion prediction (step 218). If the measure of the size of the motion vector is greater than the threshold, then Reference Image 2 (the downsampled version) is selected for motion prediction (step 220). In the event that the measure of the size of the motion vector is equal to the threshold, then either Reference Image 1 or Reference Image 2 could be selected, depending on the implementation. In one alternative, Reference Image 1 could be selected if the measure of the size of the motion vector is less than or equal to the threshold. It is noted that the correspondence between the threshold and the identified reference image described herein is exemplary, and that one skilled in the art may derive other correspondences that could be applied to the method 200.

For large motion vectors (e.g., a motion vector with a magnitude greater than the threshold), a smaller cache can be maintained, due to the use of lossy data reduction. By making the choice of reference pictures dependent on the size of the motion vector, an implementation is possible where there is a relatively small cache of full resolution reference images. With a 2×2 vertical/horizontal downsampling, the amount of cache storage required can be reduced by almost a factor of four, such that all accesses can be cached rather than randomly fetched from an external memory unit, e.g., DRAM. The caching could, in turn, result in a bandwidth reduction of 10:1 or greater.

The decoder uses the motion vector and the corresponding macroblock in the selected reference image to derive a predicted macroblock for the new image (step 222). A cheek is made whether there are more macroblocks for the new image that need to be decoded (step 224). If there are no more macroblocks for the new image, then the method terminates (step 226). If there are more macroblocks for the new image, then the motion vector for the next macroblock is decoded (step 228) and is evaluated as described above (step 216).

In an alternate embodiment, there could also be side information (i.e., information transmitted outside of the image stream) which indicates the reference image to be used. Another alternate embodiment includes indicating the reference image to be used in the bit stream.

A further alternative includes maintaining the reference images at a reduced resolution. For example, with high definition television, downsampling the reference images and storing the downsampled versions does not typically result in a large loss of clarity and could provide a reduction in memory bandwidth and/or required cache size.

Decoder Configured to Decode Images Using Downsampling

Figure 3:
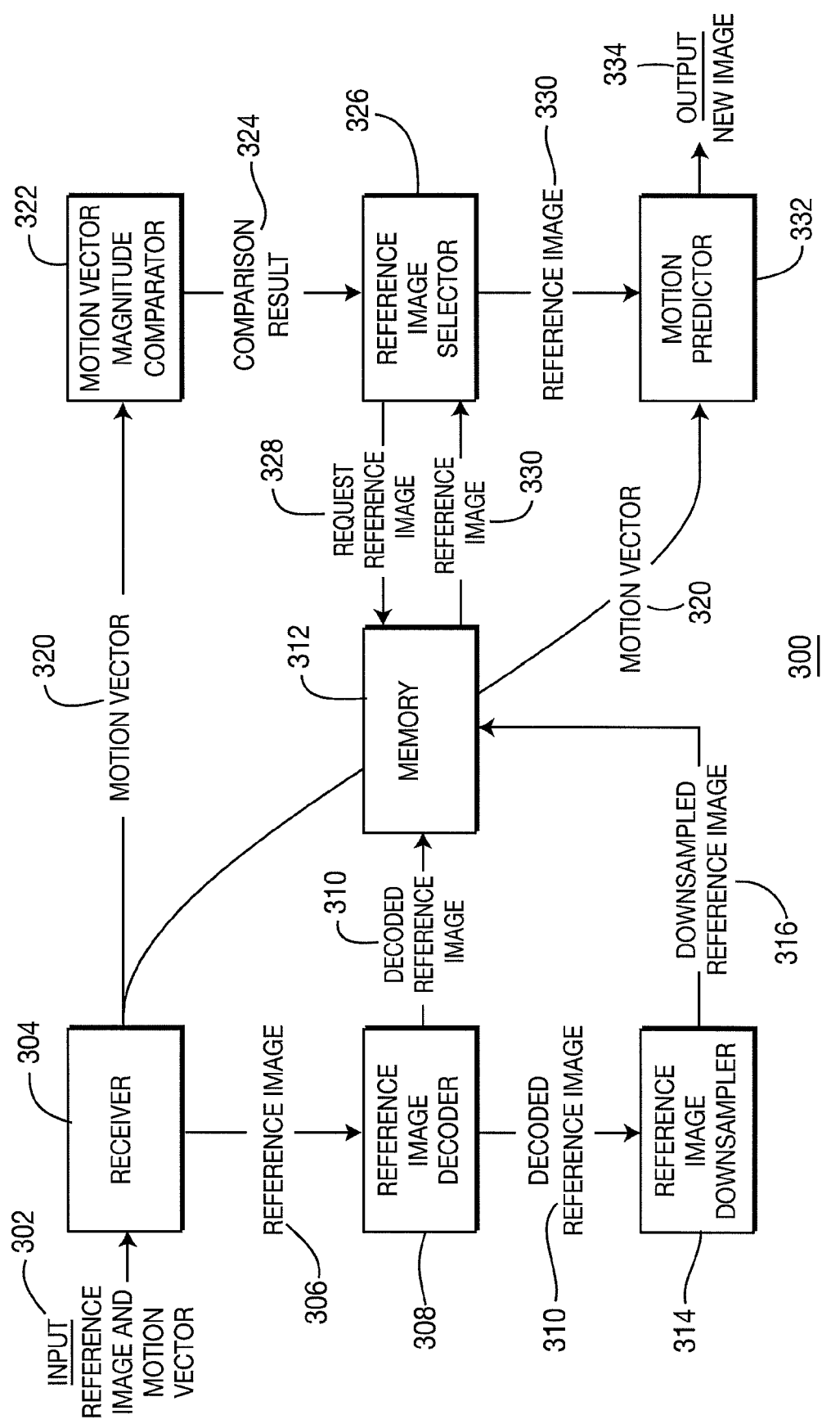
FIG. 3 is a block diagram of a decoder configured to implement the method shown in FIG. 2.

FIG. 3 is a block diagram of a decoder 300 configured to implement the method 200. The decoder 300 receives inputs 302 including a reference image and a motion vector at a receiver 304. The reference image 306 is passed to a reference image decoder 308, where it is decoded. The decoded reference image 310 is stored in a memory 312 and is passed to a reference image downsampler 314. The reference image downsampler 314 downsamples the reference image according to a predetermined downsampling factor, which in one embodiment is a 2×2 vertical/horizontal downsampling. The downsampled reference image 316 is stored in the memory 312.

The motion vector 320 is passed from the receiver 304 to a motion vector magnitude comparator 322 and a motion predictor 332. The motion vector magnitude comparator 322 determines a measure of the size of the motion vector and compares it to a predetermined threshold. In one embodiment, the threshold is a magnitude of eight pixels per frame. The comparison result 324, indicating whether the measure of the size of the motion vector is less than the threshold or greater than the threshold, is passed to a reference image selector 326.

The reference image selector sends a request 328 to the memory 312 for the reference image indicated by the comparison result 324. In one embodiment, if the measure of the size of the motion vector is less than the threshold, then the full resolution reference image is selected, and if the measure of the size of the motion vector is greater than the threshold, then the downsampled reference image is selected. The selected reference image 330 is sent from the memory 312 to the reference image selector 326 (where a cache for the reference images may be maintained), where it is passed to the motion predictor 332. The motion predictor 332 uses the motion vector 320 and the reference image 330 along with decoded residual data to generate a new image 334 as output. It is understood that the motion predictor 332 operates on each macroblock in the image. The new image 334 is the end result of applying all of the motion vectors 320 to the reference image 330.

Placing a Lower Bound on Encoder Block Size

Another embodiment (not shown in the Figures) involves imposing a lower bound on the block size used by the encoder as a function of a measure of the size of the motion vectors. By limiting the fineness of granularity of random cache accesses, the effective memory bandwidth can be reduced.

The amount of bandwidth reduction that may be achieved via this embodiment depends on how efficiently information is fetched from the cache. If only fine motion vectors are used, then only information outside the cache that can be relatively efficiently fetched is retrieved. A general problem with caching is that, in the worst case, the effective bandwidth of a dynamic random access memory (DRAM) subsystem is approximately one twentieth of its best case bandwidth depending on how the memory is accessed. If the cache is accessed regularly, there could be a 20× performance gain in terms of useful data transferred from the DRAM than could be achieved if all DRAM accesses were random accesses. When utilizing a DRAM subsystem, it is more efficient to fetch a large contiguous chunk of data. The actual performance gain may be on the order of 10:1 or 4:1, which still provides performance benefits.

Encoder Configured to Utilize Downsampling

Figure 4:
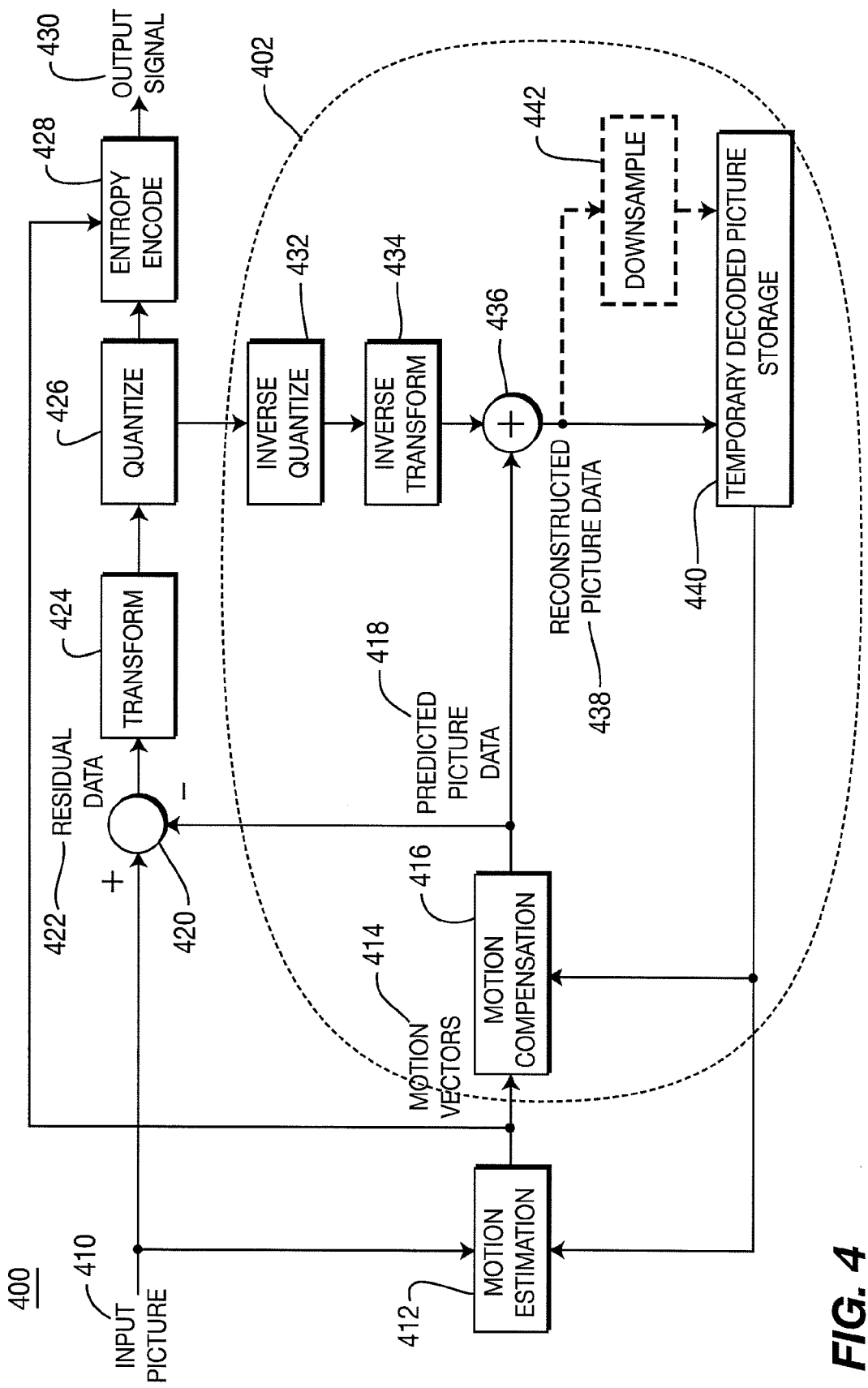
FIG. 4 is a block diagram of an encoder configured to utilize downsampling.

FIG. 4 is a block diagram of an encoder 400 configured to utilize downsampling. The encoder 400 includes an embedded decoder 402.

An input picture 410 is supplied to the encoder 400 and is sent to a motion estimation block 412 and a subtractor 420. The motion estimation block 412 compares the input picture 410 to a reference image to generate a motion vector 414. The motion vector 414 is passed to a motion compensation block 416 which generates predicted picture data 418. The predicted picture data 418 is supplied to the subtractor 420, where it is combined with the input picture 410 to produce residual data 422. Residual data is the difference between the input picture 410 and the predicted picture data 418. The residual data 422 is added to the predicted picture data 418 during decoding to obtain the final image.

The residual data 422 is passed to a transform block 424. Typically, the transform block 424 performs a discrete cosine transform on the residual data 422. The transformed data is passed to a quantize block 426 and then to an entropy encoder 428. The entropy encoder 428 encodes the residual data 422 with the motion vector 414 generated by the motion estimation block 412 to produce an output signal 430.

In order to accurately produce motion vectors 414 and residual data 422, the encoder 400 needs to use the same information that will be used by a decoder that receives the output signal 430. This is why the decoder 402 is embedded within the encoder 400.

In the decoder 402, an inverse quantize block 432 receives the quantized residual data 422 from the quantize block 426 and dequantizes the residual data. An inverse transform block 434 performs an inverse transform operation (typically an inverse discrete cosine transform) on the residual data 422 which is then passed to an adder 436. The adder 436 combines the residual data 422 with the predicted picture data 418 from the motion compensation block 416 to produce reconstructed picture data 438. The reconstructed picture data 438 is stored in a temporary decoded picture storage 440. The reconstructed picture data 438 may also be downsampled by a downsampler 442 and the downsampled picture data is stored in the picture storage 440.

The motion estimation block 412 and the motion compensation block 418 use the reconstructed picture data 438 and the downsampled picture data to generate subsequent motion vectors 414 and predicted picture data 418, respectively.

The present invention can be implemented in a computer program tangibly embodied in a computer-readable storage medium containing a set of instructions for execution by a processor or a general purpose computer; and method steps can be performed by a processor executing a program of instructions by operating on input data and generating output data. Suitable processors include, by way of example, both general and special purpose processors. Typically, a processor will receive instructions and data from a read-only memory (ROM), a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A method for reducing memory bandwidth in a video decoder, comprising:
  performing a data reduction operation on a decoded first coded image to produce a second set of image data;
  storing the second set of image data; and
  determining whether to utilize the stored second set of image data for subsequent image decoding based at least in part on a size of a received motion vector.

2. The method according to claim 1, further comprising selectively using the first coded image for subsequent image decoding when the size of the received motion vector is less than a predetermined threshold.

3. The method according to claim 1, wherein the data reduction operation is image downsampling.

4. The method according to claim 3, wherein the downsampling operation reduces pixel density by a factor of two in vertical and horizontal directions.

5. The method according to claim 1, wherein the data reduction operation is quantized transform coding.

6. The method according to claim 1, further comprising:
  comparing a size of the received motion vector against a predetermined threshold, wherein the second set of image data is selected when the size of the received motion vector is greater than the predetermined threshold.

7. The method according to claim 6, wherein the predetermined threshold is a magnitude of eight pixels per frame.

8. The method according to claim 1, further comprising generating a new image as output using the received motion vector, the second set of image data, and decoded residual data.

9. The method according to claim 1, wherein the first coded image is a full resolution image.

10. A video decoder system configured to utilize a reduced memory bandwidth, comprising:
  a data reducer configured to reduce a decoded first coded image to produce a second set of image data; and a memory configured to store the decoded first coded image and the second set of image data; and a decoder configured to determine whether to utilize the stored second set of image data for subsequent image decoding based at least in part on a size of a received motion vector.

11. The video decoder system according to claim 10, wherein said data reducer is an image downsampler configured to downsample the decoded first coded image.

12. The video decoder system according to claim 11, wherein said image downsampler is configured to reduce pixel density by a factor of two in vertical and horizontal directions.

13. The video decoder system according to claim 10, wherein the decoder comprises a processor configured to compare a size of the received motion vector against a predetermined threshold, wherein the second set of image data is selected when the size of the received motion vector is greater than the predetermined threshold.

14. The video decoder system according to claim 10, wherein the decoder comprises a processor configured to generate a new image as output using the received motion vector, the second set of image data, and decoded residual data.

15. The video decoder system according to claim 10, wherein the first coded image is a full resolution image.

16. A video decoder system configured to utilize a reduced memory bandwidth, comprising:

an image downsampler configured to downsample a decoded reference image;

a memory configured to store the decoded reference image and the downsampled reference image; and a decoder configured to select one of the stored decoded reference image or the stored downsampled reference image for subsequent image decoding based at least in part on a size of a received motion vector.

17. The video decoder system according to claim 16, wherein the downsampled reference image is a 2×2 vertical/horizontal downsampling.

18. The video decoder system according to claim 16, wherein the decoder comprises a processor configured to compare a size of the received motion vector against a predetermined threshold, wherein the downsampled reference image is selected when the size of the received motion vector is greater than the predetermined threshold.

19. The video decoder system according to claim 18, wherein the predetermined threshold is a magnitude of eight pixels per frame.

20. The video decoder system according to claim 16, wherein the decoded reference image is a full resolution image.

* * * * *